J. H. WAGENHORST.
VEHICLE WHEEL RIM.
APPLICATION FILED MAR. 14, 1911.
1,177,456.
Patented Mar. 28, 1916.
2 SHEETS—SHEET 1.
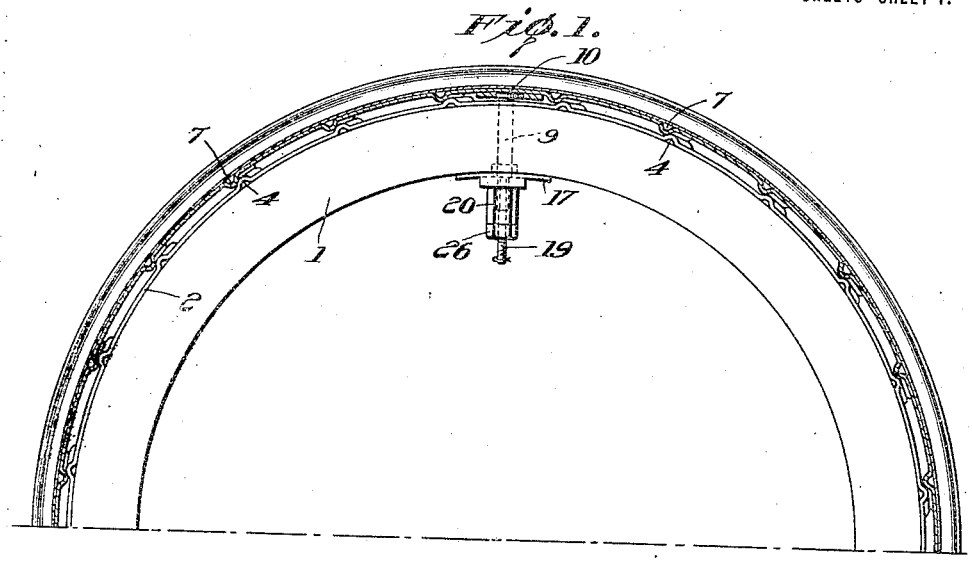
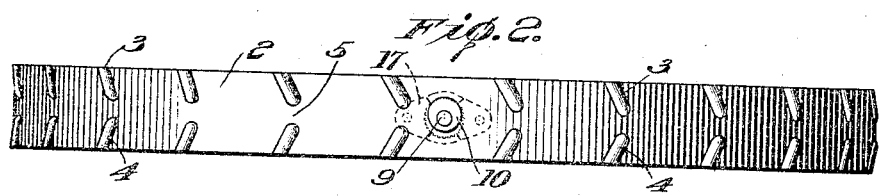
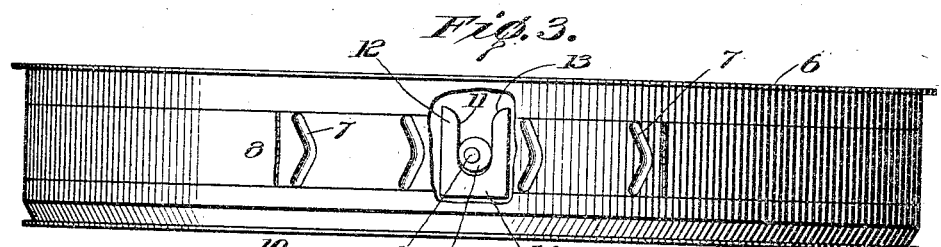
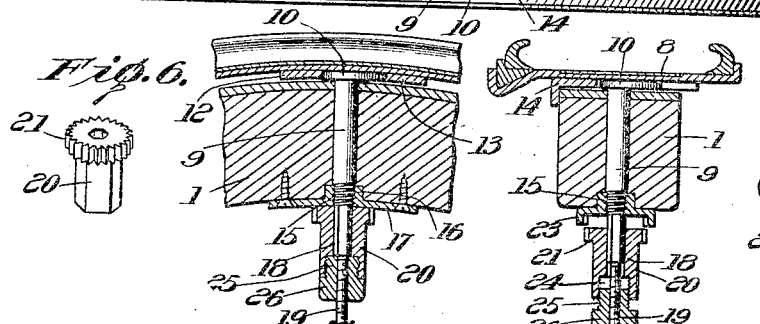 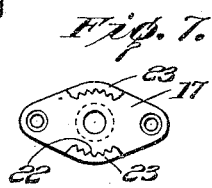
Witnesses:
Karl S. Dritz
Gerald E. Terwilliger
Inventor
James H. Wagenhorst
By his Attorney
Seward Davis

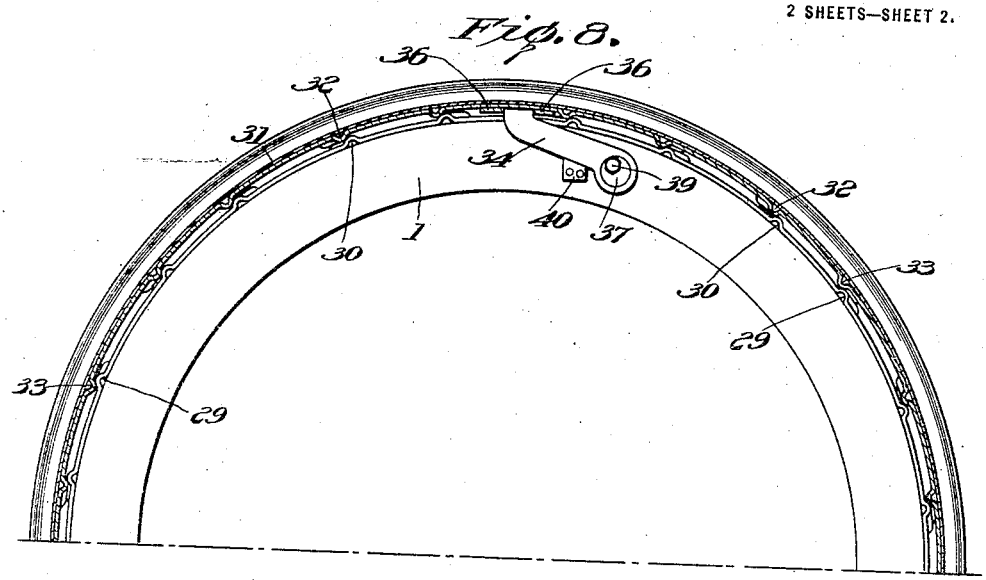
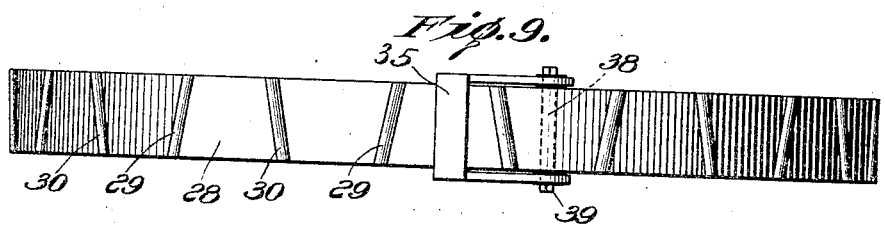
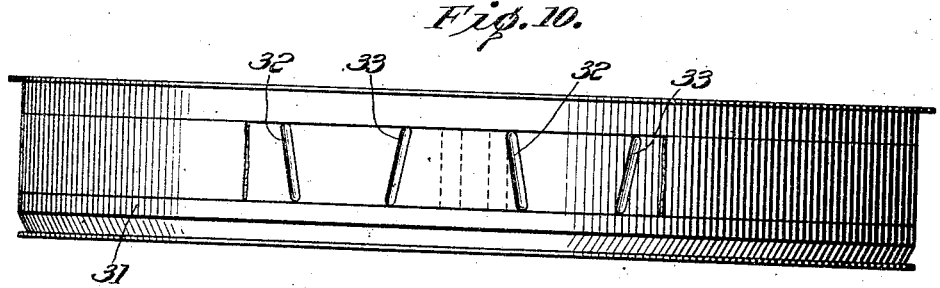
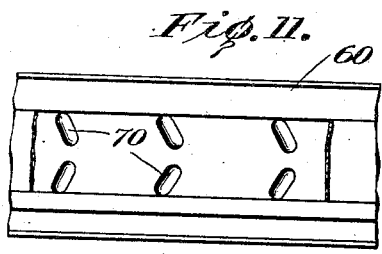

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,456.  Specification of Letters Patent.  Patented Mar. 28, 1916.

Application filed March 14, 1911. Serial No. 614,359.

*To all whom it may concern:*

Be it known that I, JAMES H. WAGENHORST, a citizen of the United States, residing at Akron, county of Summit, and State of Ohio, have invented certain new and useful Improvements in Vehicle-Wheel Rims, of which the following is a specification.

This invention relates to vehicle wheel rims of what are commonly called the demountable type, the characteristic of this type being that the tire-carrying rim or rim proper is removably mounted upon the vehicle wheel. With such a construction a number of tire-carrying rims, each carrying an inflated tire, are provided, and in case of accident to a tire in use, it, with the rim upon which it is carried, may be removed and replaced by a rim carrying a perfect tire.

My invention contemplates an improved structure whereby tire-carrying rims may be readily and interchangeably secured to a vehicle wheel.

In the accompanying drawings, which form a part of this specification, Figure 1 is a side elevation of a portion of a wheel felly and felly band having applied thereto a rim shown in longitudinal section and illustrating one embodiment of my invention; Fig. 2 is a plan view of the wheel shown in Fig. 1 with the tire-carrying rim removed; Fig. 3 is a plan view of the rim shown in Fig. 1, parts being broken away; Fig. 4 is a longitudinal sectional view on an enlarged scale through the felly, felly band and rim, illustrating the means for moving the rim into locking engagement with the felly band and retaining it in such position; Fig. 5 is a transverse sectional view illustrating the parts shown in Fig. 4; Fig. 6 is a perspective view of the operating and locking sleeve; Fig. 7 is a plan view of the locking plate or washer; Fig. 8 is a view similar to Fig. 1, illustrating a modified form of my invention; Fig. 9 is a plan view of the wheel shown in Fig. 8 with the tire-carrying rim removed; Fig. 10 is a plan view of the tire-carrying rim shown in Fig. 8, parts being broken away; Fig. 11 is a view similar to Fig. 2, illustrating a modified form of rim, and Fig. 12 is a cross-section of another modified form of rim.

While I have shown and will describe in detail in this specification certain specific embodiments of my invention, I do not wish to limit myself thereto, as my invention may be embodied in structures of many other forms.

Referring to the drawings in detail, the numeral 1 designates a wheel felly, to which is permanently secured, by shrinking or otherwise, a felly band 2 having formed thereupon a plurality of ridges. These ridges are preferably arranged in two series, the ridges 3 of one series being inclined to the ridges 4 of the other series, such ridges being inclined equally but in opposite direction from elements of the felly surface. In cross-section these ridges may be rounded, as shown, or otherwise suitably shaped, so long as they have at one side a wedging surface. They are preferably formed by being struck up or pressed in the metal of the felly band. By making them in this way the thickness of the felly band and its weight are not increased. When formed in this manner the sets of ridges are preferably separated by a space 5, thus leaving a continuous and uncorrugated ring of metal at the center of the felly band which will seat upon the wheel felly and also withstand the tension put upon the felly band by shrinking or otherwise, which, if this were not done, might tend to straighten out the corrugations.

6 designates the tire-carrying rim, which may be provided with any suitable means for retaining a tire, this rim having projecting from its inner face a plurality of angularly disposed or herring-bone shaped ridges 7. These ridges may be continuous from end to end, as shown in Fig. 3, or may be formed in two oppositely disposed separated series, as indicated at 70 upon the rim 60 shown in Fig. 11. In cross-section the ridges 7 may be rounded, as shown in Fig. 1, or may be otherwise shaped, so long as they are provided with wedging surfaces adapted to engage the corresponding wedging surfaces of the ridges upon the felly band. The ridges 7, like the ridges 3 and 4, are preferably formed by being struck from or pressed in the metal of the rim, though they may be formed, if desired, in any other suitable manner.

In some cases it may be desirable, in order that the rim may present a smooth outer surface for the tire to seat upon, to roll a shallow depression in the rim and strike the ridges from the bottom of the depression, as shown in Figs. 3 and 4. The depression may then be filled with a thin band or hoop 8 which will cover the depressions formed in the rim by pressing the ridges therefrom.

The rim is secured upon the wheel by simply slipping the same thereover and turning it slightly circumferentially of the wheel. This will cause the herring-bone-shaped ridges upon the rim to engage with the oppositely inclined ridges upon the felly band. Owing to the inclination of the ridges to the elements of the wheel surface, the rim will be first centered upon the wheel, after which the inclined wedging faces of the ridges upon the rim will ride up over the inclined wedging faces of the ridges upon the felly band, which will cause the rim to seat rigidly on the latter. The inclination of the ridges which caused the rim to be centered upon the wheel will also lock the former against lateral movement upon the latter so long as circumferential movement between the two is prevented. Thus the operation of locking the tire-carrying rim upon the wheel requires simply a slight circumferential movement of the one upon the other and the holding of the rim against circumferential movement in the reverse direction.

Removal of the rim from the wheel is equally simple, requiring merely a slight backward circumferential movement of the rim upon the wheel. If the wedging faces of the ridges have a considerable inclination, and particularly if they are simply rounded, as shown, no considerable engaging surfaces which may rust together are provided, and in the demounting of the rim there is nothing akin to a sliding action of one surface upon another, but rather the surfaces are simply separated by the surfaces of the ridges upon the rim being drawn or lifted from the surfaces of the ridges upon the felly band. With this construction the rim cannot rust upon the felly band sufficiently to prevent its ready removal therefrom under even the most adverse conditions.

By providing a considerable number of ridges upon the rim and felly band and forming the wedging surfaces thereupon at a considerable angle, or more particularly by making the ridges rounded, as shown, great exactness of dimension for the rim and felly band are not required. This is a matter of importance, as it is essential that the rims be capable of being mounted interchangeably upon different wheels.

For causing the rim to move circumferentially of the felly and locking the same in adjusted position, I may use any suitable means, but prefer the device illustrated in Figs. 1 to 7. This device comprises the bolt 9 passing radially through the felly band and felly of the wheel and having an eccentric or cam-shaped head 10 adapted to engage in a recess 11 formed in a plate 12 secured to the under-side of the tire-carrying rim. The rotation of the bolt and eccentric head through a half revolution will obviously move the rim circumferentially upon the felly band through a distance equal to twice the throw of the eccentric in either direction, depending upon the direction of rotation of the bolt. The recess 11 in the plate 12 preferably widens out toward one end, as indicated at 13, in order to facilitate the engagement with the eccentric bolt-head when applying the rim to the wheel, and the plate is also preferably provided at one edge with an inwardly turned flange 14 adapted to engage the side of the wheel and limit the lateral movement of the rim while it is being applied thereto. The bolt 9 is preferably provided with a screw-threaded portion 15 adapted to engage with the threads formed in the boss 16 projecting from a plate or washer 17 secured to the inside of the wheel felly. The bolt is also provided with an extension 18 of angular, preferably hexagonal, section, and with a threaded portion of reduced diameter, 19. The portion 18 of the bolt is engaged by a sleeve 20, the inside of which is of hexagonal outline, or otherwise shaped, in accordance with the cross-section of the portion 18 of the bolt, the outside of the sleeve being so formed as to be capable of engagement by a wrench or other suitable means for turning the same. At one end this sleeve is provided with a collar 21, provided with a plurality of teeth adapted to engage with teeth 22 formed upon flanges 23 projecting from the plate 17. The opposite end of the sleeve 18 has formed in it a recess 24 which is provided with an internal thread, preferably of small pitch, which is adapted to be engaged by an external thread 25 formed upon a lock-nut 26 which screws upon the threaded portion 19 of the bolt. The pitch of the thread upon the bolt portion 19 is greater than the pitch of the thread 25, but is preferably of the same direction, in order to facilitate the assembling of the parts. The end of the threaded portion 19 may be extended beyond the nut 26 and have a pin 27 passed through it, if desired, in order to prevent the possible detachment of the nut.

The operation of the rim is as follows:

A tire-carrying rim having a pneumatic or other resilient tire thereon is slipped over the felly band, the valve-stem of the tire being first passed through a hole cut in the felly for the purpose. The flange 14 will prevent the rim from being moved too far. The use of the flange or equivalent means is, however, not necessary. The parts of the fastening means being now in the position shown in Fig. 5, it will be seen that the teeth on flange 21 are out of engagement with the teeth on the flanges 23. A wrench may now be applied to the sleeve 18, and the sleeve, carrying with it the bolt 9, may be rotated, thus rotating the eccentric 10, which, through its engagement with the plate 12, will move the rim upon the felly. Such movement will cause the ridges on the rim to engage with the ridges upon the felly band, thus first centering the rim and then firmly locking it in position upon the wheel in the manner already described. In order to lock the rim in this position the nut 26 is now rotated, which will cause it to travel along the bolt portion 19 and at the same time screw into the recess 24 in the sleeve 18. As the thread on the bolt portion is, however, of greater pitch than the thread 25, there will be a resultant motion of the sleeve 18 toward the felly, which will cause the teeth on the flange 21 to engage with the teeth 22 on the plate 17. The parts will finally be brought into the position shown in Fig. 4, in which the sleeve 18 is firmly locked against rotation by means of the engaging teeth, it in turn locking the bolt and eccentric against rotation. The nut 26 will screw tightly into the recess in the bolt, as shown in Fig. 4, and will act effectively as a lock-nut. The rotation of the bolt through a half revolution in mounting the rim upon the wheel will, owing to the engagement of its threaded portion 15 with the threads in the boss 16, move the bolt longitudinally a little way. The pitch of the thread 15 is preferably made such that the cam-head or eccentric 10 will be lifted away from the felly band. This will cause the head to rise with the plate 12 as the rim is carried up or expanded by the engagement of the ridges on the rim and felly band. This movement is very slight, but by moving the cam-head in the same direction the engagement between the cam-head and the face of the recess 11 will be increased rather than diminished as pressure is brought to bear between the two. To remove the rim the operations first described are reversed: that is, the nut 26 is screwed down to the position shown in Fig. 5, drawing with it the sleeve 18, until the teeth on the latter are free from the teeth on the plate 17. The bolt may now be rotated, when the eccentric will move the rim in reverse direction, freeing the ridges thereon from the ridges upon the felly band. The power which may be exerted through the bolt and cam is ample to break any rust which may have formed between the engaging surfaces of the rim and felly band. The rim is now free to be drawn off.

In the modification of my invention shown in Figs. 8, 9 and 10, the felly 1 is provided with a felly band 28 having two series of ridges 29 and 30 formed thereon, these ridges preferably extending entirely across the surface of the felly band. The ridges of the two series are oppositely inclined with relation to elements of the felly band surface. The rim 31 is provided with similarly disposed ridges 32 and 33. When the rim is placed upon the felly band and rotated with relation thereto, it will be seen that the ridges 32 will engage with the ridges 30 upon the felly band, the ridges 33 engaging with the ridges 29. Owing to the opposite inclination of alternate ridges, the rim will be centered upon the felly band, as with the arrangement of the ridges previously described. The rim will also be firmly locked upon the felly band. I may use with this rim the operating and locking means shown in Figs. 1 to 7, though I have shown another device in Figs. 8 to 10 for this purpose. The means shown in these figures comprise a yoke 34, the crosspiece 35 of which engages with blocks 36 carried by the under-surface of the rim. The ends of the yoke-arms are perforated and engage with cams or eccentrics 37 formed upon the ends of a shaft 38 passing transversely through the felly. The ends of the shaft may be provided with heads 39 for engagement by a wrench, or with other suitable means for turning the same. Any desired mechanism for locking the eccentrics after rotation may be employed, though I have shown them so constructed as to be self-locking. To accomplish this, I provide stops 40 upon the sides of the felly adapted to be engaged by the arms of the yoke 34, which will limit the movement of the eccentrics in one direction. These stops are so placed that the yoke-arms will not engage them until the eccentrics have passed the dead center, that is, gone beyond the line of pull upon the yoke, passing through the axis of the shaft 38. When the eccentrics are moved to this position, tension upon the yoke will simply lock them more firmly. To detach the rim it is simply necessary to rotate the shaft and eccentrics carried thereby in the reverse direction, which will raise the yoke from the stops and cause it to force the rim upon the felly band in such a direction as to disengage the ridges upon those members.

In Fig. 12 I have illustrated a modified form of rim in which no ridges are formed in the metal of the rim itself, but a band 80

Having thus described my invention, I claim:

1. The combination of a vehicle wheel having ridges projecting from the outer surface thereof, with a tire-carrying rim adapted to be removably secured to said wheel, said rim having ridges projecting from its inner surface, the ridges on the rim and wheel having rounded wedging surfaces adapted to engage when the rim is locked upon the wheel, said rounded surfaces forming the only bearing surfaces of the rim upon the wheel.

2. The combination of a vehicle wheel having ridges projecting from its outer surface inclined in opposite directions to elements of said surface, and a rim adapted to be removably secured to the wheel, said rim having ridges struck inward from the metal thereof and adapted to engage the ridges on the wheel.

3. In a vehicle wheel, in combination, a felly, a felly band mounted thereon and having projecting ridges struck from the metal thereof and inclined in opposite directions to elements of the felly band surface, and a tire-carrying rim adapted to be removably secured to said felly having ridges projecting from its inner surface adapted to engage the ridges on the felly band.

4. A tire-carrying member for demountable rims comprising a band provided with means for engaging a resilient tire and having struck inward therefrom, without thickening the metal of the band, a plurality of herring-bone-shaped ridges or corrugations.

5. A felly band for demountable rims adapted to be shrunk upon a wheel felly and having struck therefrom, without thickening the metal thereof, two series of ridges or corrugations extending in a generally transverse direction, but oppositely inclined to elements of the felly band surface, the ridges of the two series being separated by a central strip of uncorrugated metal.

6. The combination of a vehicle wheel having wedging surfaces on its periphery inclined in opposite directions to elements of the wheel surface, said wedging surfaces being of convex rounded section, a tire-carrying rim having wedging surfaces of convex rounded section, engaging the wedging surfaces of the wheel and correspondingly inclined to elements of the wheel surface, and means for rotating said rim upon said wheel to bring said surfaces into wedging engagement, and for locking said rim in such rotated position.

7. In a vehicle wheel, in combination, a felly, a detachable tire-carrying rim, means on the rim and felly adapted to lock the rim to the felly upon movement of the rim circumferentially with relation to the felly, and means for moving the rim circumferentially of the felly including a rotary cam carried by one of said members positioned substantially centrally with respect to the breadth of the member and an abutment on the other of said members, the axis of said cam being substantially radial with respect to said wheel.

8. In a vehicle wheel, in combination, a felly, a detachable tire-carrying rim, means on the rim and felly adapted to lock the rim to the felly upon movement of the rim circumferentially with relation to the felly, and means for moving the rim circumferentially of the felly comprising a bolt passing radially through the felly having a cam or eccentric head engaging portions of the rim.

9. In a vehicle wheel, in combination, a felly, a detachable tire-carrying rim, means on the rim and felly adapted to lock the rim to the felly upon movement of the rim circumferentially with relation to the felly, and means for moving the rim circumferentially of the felly comprising a bolt passing radially through the felly, a cam or eccentric head on the outer end of said bolt, a plate secured to the inner face of said rim engaged by said head, means for rotating said bolt, and means for locking said bolt against rotation.

10. In a vehicle wheel, in combination, a felly, a detachable tire-carrying rim, means on the rim and felly adapted to lock the rim to the felly upon movement of the rim circumferentially with relation to the felly, and means for moving the rim circumferentially of the felly comprising a bolt passing radially through said felly and having a cam or eccentric head engaging portions of said rim, said bolt having a portion of irregular cross-section projecting inward from said felly and a threaded extension, a sleeve shaped for engagement by a wrench fitting the bolt portion of irregular cross-section and slidable thereon, and a nut screwing upon the threaded extension of said bolt and engaging said sleeve.

11. In a vehicle wheel, in combination, a felly, a detachable tire-carrying rim, means on the rim and felly adapted to lock the rim to the felly upon movement of the rim circumferentially with relation to the felly, and means for moving the rim circumferentially of the felly comprising a bolt passing radially through said felly and having a cam or eccentric head, a recessed plate secured to the inner surface of said rim and engaging said head, said bolt having a portion of irregular cross-section extending inward from said felly, and a threaded extension of reduced diameter, a sleeve shaped for engagement by a wrench fitting said portion of irregular cross-section and slidable thereon, said sleeve being provided with teeth adjacent the inner surface of the felly, a plate secured to the felly provided with teeth adapted to be engaged by the teeth upon said sleeve, the outer end of said sleeve being recessed and internally screw-threaded, and a nut screwing on the threaded extension of said bolt and having an externally screw-threaded portion engaging the threads in the recess in said sleeve.

12. In a vehicle wheel, in combination, a felly, felly band thereon having ridges projecting therefrom oppositely inclined with relation to elements of the felly surface, a tire-carrying rim adapted to be removably mounted upon said felly band having ridges projecting from the inner face thereof adapted to engage the ridges upon the felly band, and means for moving said rim circumferentially with relation to said felly band, to cause the ridges on the former to engage with the ridges on the latter, said means comprising a plate secured to the inner surface of said rim, a bolt passing radially through said felly having a cam or eccentric head at its outer end adapted to engage the plate on said rim, said bolt having a threaded portion located near the inner surface of the felly, a portion of irregular cross-section projecting inward from the felly, and a threaded extension of reduced diameter, a plate secured to the inner surface of the felly having a threaded opening therethrough, the threads of which engage the first threaded portion of the bolt, said plate having flanges projecting therefrom provided with inwardly projecting teeth, a sleeve shaped for engagement by a wrench fitting the bolt portion of irregular cross-section and slidable thereon, said sleeve having at the end thereof adjacent to the felly outwardly projecting teeth adapted to engage the teeth on the flanges projecting from the plate secured to the felly when the sleeve is moved toward the felly, said teeth adapted to be disengaged when said sleeve is moved in the opposite direction, the outer end of said sleeve being recessed and internally screw-threaded, and a nut screwing on the threaded extension of said bolt and having an externally screw-threaded portion adapted to engage the teeth in the recess in said sleeve, the pitch of the thread on the threaded extension of said bolt being of the same direction as the pitch of the thread on said nut, but greater than the latter.

13. The combination of a vehicle wheel having ridges projecting from its outer surface and abruptly inclined to the edges thereof, and a tire-carrying rim removably secured to the wheel by means of similarly inclined ridges projecting from its inner face and engaging ridges on the wheel, each ridge being substantially uniform in cross-section throughout.

JAMES H. WAGENHORST.

Witnesses:
SEWARD DAVIS,
KARL A. DEITZ.